April 29, 1941. H. M. J. T. DE FOIX 2,240,245
BAG FOR PRESERVING FOODSTUFFS AND METHOD OF MAKING
Filed June 7, 1938 2 Sheets-Sheet 1
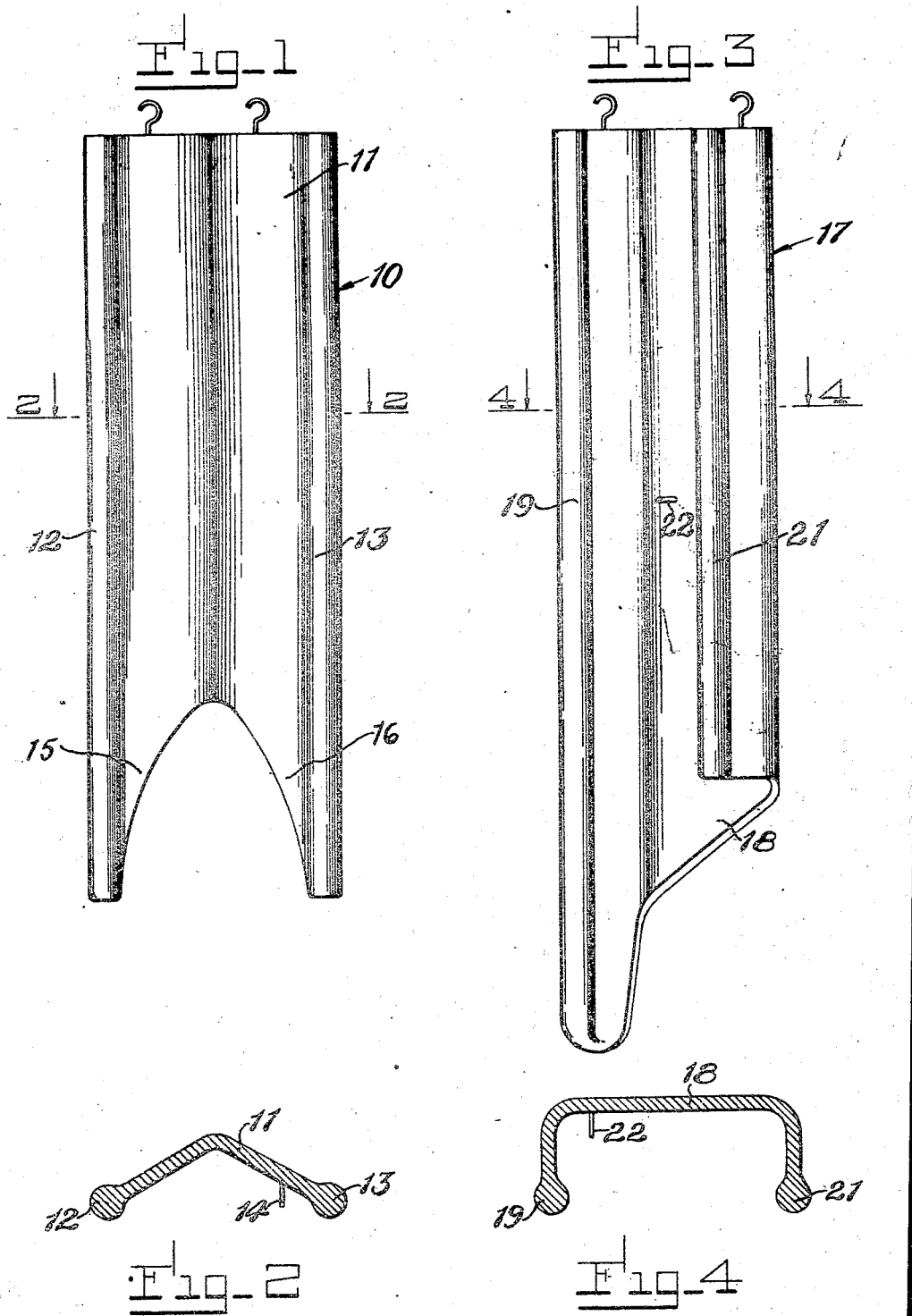
INVENTOR
Henri M. J. T. de Poix
By Theodore C. Brown
Atty

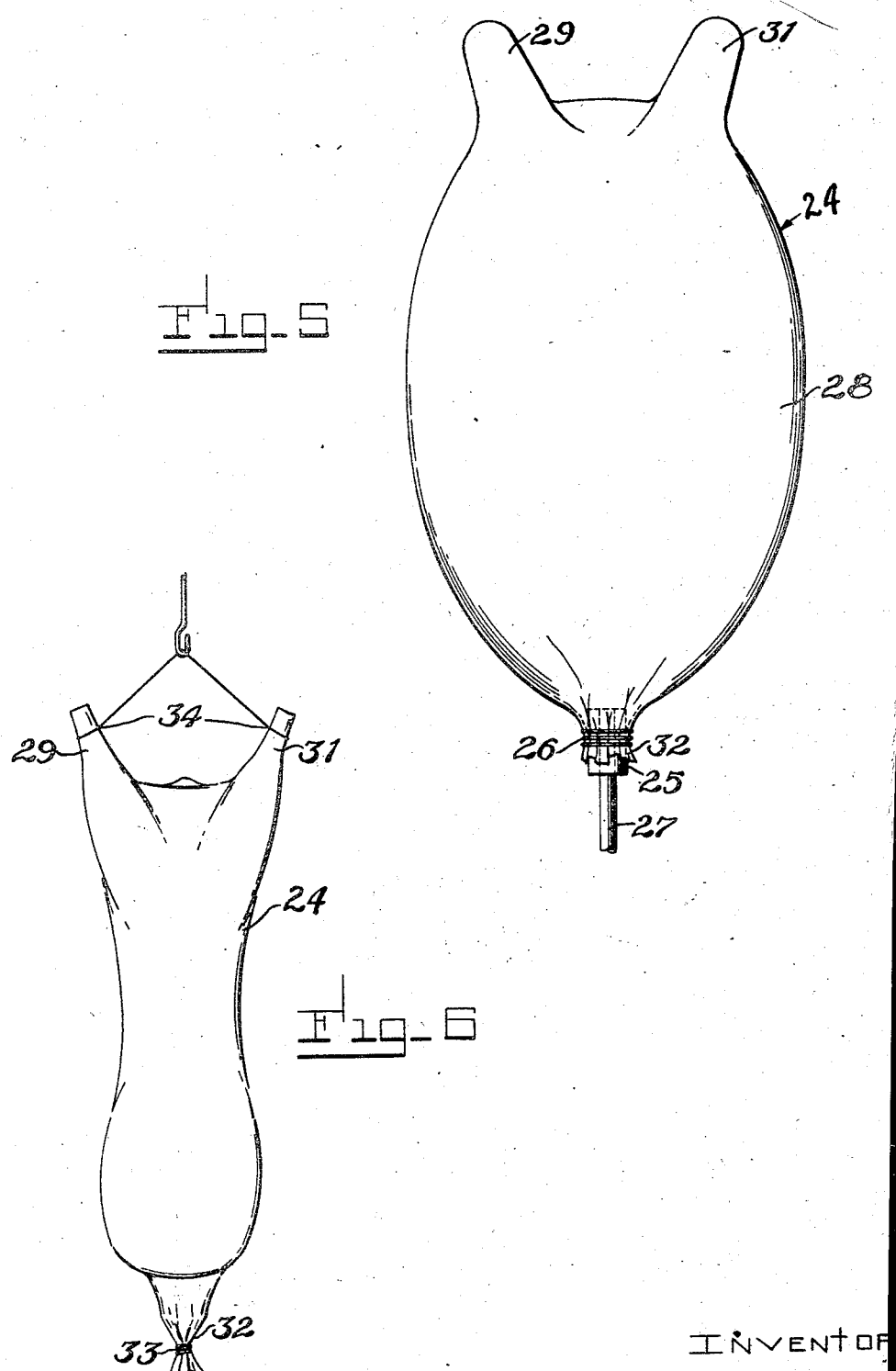

Patented Apr. 29, 1941

2,240,245

UNITED STATES PATENT OFFICE 2,240,245

BAG FOR PRESERVING FOODSTUFFS AND METHOD OF MAKING

Henri Marie Joseph Tyrel de Poix, Rueil, France, assignor to Dewey and Almy Chemical Company, Cambridge, Mass., a corporation of Massachusetts Application June 7, 1938, Serial No. 212,359
In France June 22, 1937

7 Claims. (Cl. 18—47.5)

This invention relates to impervious, flexible, containers which may be used in the preservation of foodstuffs and more particularly may be used in connection with the storage, ageing and freezing of such products.

Although the containers of this invention are suitable for use in the preservation of any foodstuffs that may be preserved by refrigeration or freezing, they are particularly suitable for use in the preservation of meats, and, consequently, for convenience in description, I shall describe it as applied to the preservation of beef quarters and carcasses of smaller animals.

It has been proposed to enclose foodstuffs in flexible containers, for example, in vulcanized rubber sacks or bags of rubber hydroalides, and after evacuating the bag, sealing it in such a manner that no air gains entrance. The meat thereafter may be chilled according to conventional practice or frozen, and, in this instance, very quick freezing may be brought about because the covered carcass may be directly immersed in the cold brine or sprayed or hosed down with the refrigerant. Since it is intended to store the foodstuffs in the envelopes for long periods of time, suitable materials must be permanent and have no ultimate effect on taste or odor.

The containers so far proposed, however, possess very serious drawbacks. If an ordinary rubber sack is used, the vulcanizing agents contaminate the food with offensive tastes and odors, but the most serious defect associated with the use of rubber bags lies in the resilience of vulcanized rubber at low temperatures for, since the bags as they cover the meat are always distended somewhere, a puncture or a tear causes the rubber to pull away from the immediate vicinity of the tear and sometimes to split for such a distance that the covering is useless. To avoid this defect, the bags have been made from heavy material which causes them to be prohibitively expensive. Aside from expense, the production of such a large, heavy rubber envelope, presents a serious manufacturing problem in itself.

Bags of other materials which have been proposed are faulty either because they require a subsequent heat treatment at temperatures which are harmful to foods or because of their high cost of manufacture or because the material itself is so brittle that it is impossible to handle the carcass as frequently as necessary without the probability that the wrapping will be torn and ruined.

As a result, although the advantages of the hermetic wrapping of meats for freezing, storing or ageing has been well understood and its effect on the prevention of losses by evaporation and trimming and the retention of juices which it secures is well known, impervious sacks still are not used for the commercial preservation and storage of meat.

It is an object of this invention to produce thin, light and such relatively inexpensive envelopes that reuse is not necessary; to produce impervious envelopes which may be sealed in a dependable manner after evacuating or expelling the air; which possess the distinct advantage that they are dead and inelastic at chilling or refrigeration temperatures; that will not pull away and expose any large area of beef after puncture; that may be shrunk down onto the beef by a simple method to cause the covering to cling to the beef almost as if it were the skin of the animal; and to produce covers which, in their shrunken condition, are transparent and relatively free from wrinkles and folds; which permit the condition of the meat to be determined without the necessity of removing the bag and which present an attractive, salable, commercial package.

I have discovered that the peculiar physical characteristics of unvulcanized rubber adapt it to the preservation of meats to a wholly unexpected degree. I may now preserve meat and other foodstuffs in extremely thin and, hence, cheap envelopes, and I find it no longer necessary to provide heavy and expensive coverings since the re-use of the envelope is no longer an economic necessity.

I proceed in the manufacture of such containers in the following manner:

A flattened form, which, if desired, may be shaped into rough conformity with the carcass to be protected, is dipped in a solution of rubber. Preferably, however, because a much thicker and stronger coating can be built up quickly on the dipping form, I prefer to dip the form in an aqueous dispersion of natural or artificial rubber, for example, concentrated latex. Aside from the necessary bactericides and latex preservatives, the latex need not be further compounded, but dyes and pigments may be added to designate grades or trade-mark articles. The deposit of rubber upon the form may be brought about by any of the well known dipping procedures and, after a liquid coating of sufficient thickness has been deposited, the form is withdrawn from the tank of dispersion. Thereafter, the coating of latex is allowed to dry thoroughly. This may be accomplished wholly upon the dipping form itself, although, in order to release the dipping forms as quickly as possible and return them to the dipping machine, I prefer to transfer the partially dried rubber coating to a secondary drying form and to maintain the coating on this form until the water has been evaporated.

The bags are then removed from the drying form and may be dusted with any suitable nontoxic anti-sticking compound. Since food products are involved, I prefer to use starch as the dusting composition. Bags in this condition may be furnished to the food packer or he may find it preferable to buy the bags in a distended state.

To distend the envelope it is merely necessary to gather the open end of the bag about an inflating nozzle and blow in compressed air until the rubber envelope has been enlarged to such a size that the carcass may easily be placed therein. In this case, the envelope, except for the neck portion, which was held against the nozzle, will be inflated to a fairly uniform degree. If projections have been formed on the envelope so that pockets are formed to enclose the legs or neck of the animal, the rubber in these projections will not be distended to so great a degree and will be thicker and stronger. Therefore, the rubber in the neck portion of the envelope and in the leg pockets is more able to stand the strain of the ligatures which are used for closing the bag and for tying around the legs to hang up the carcass.

Uncured rubber in an expanded or extended condition is physically unstable to a rise in temperature. At room temperature it will contract toward its original size very slowly or not at all, but, if the temperature be raised approximately to 140° F., it springs back to about 125% of its original size almost instantaneously.

Consequently, if the bags are to be shipped through areas where they may be subjected to high temperatures, it is preferable to supply the food packer with unexpanded bags. If the bags will not be subjected to elevated temperatures in shipment, they may be expanded at the point of their manufacture. At the food packing plant, after the animal is slaughtered and properly cleaned and prepared, the carcass is placed in one of my expanded rubber envelopes. If the envelope has been provided with pockets, the legs of the beef quarter, mutton or pork are fitted into the pockets and then the open end of the bag, i. e. the neck portion of the envelope, is twisted and securely tied to form an air tight seal. A vacuum line is attached to a small tube formed on the envelope, and the air which may be trapped between the carcass and the bag is sucked out. At this moment, the bag, which very loosely enfolds the carcass, is pushed against it by the outside atmospheric pressure, forming a great number of wrinkles and folds. Alternatively, instead of exhausting the air by vacuum, it may be pressed out from between the carcass and the bag by means of external pressure.

I then heat the wrapped carcass very briefly in order to cause the restoring forces in the rubber bag to become active and to cause the folds and wrinkles to disappear. This may be done by dipping the carcass for no more than one or two seconds into water heated to a temperature of about 140° F. or the carcass may be pushed through a hot room on its way to the cooler. Only this momentary heating is necessary to shrink the coating down against the carcass so tightly that it appears almost as a transparent skin and hardly any spot is left on complicated cuts where the envelope is not in close contact with the meat.

The invention may be more readily understood by reference to the drawings. Fig. 1 illustrates a form 10, suitable for making an envelope designed to enclose a mutton. It comprises a V-shaped web portion 11 bearing two rounded marginal flanges 12 and 13. If desired, a small projecting pin 14 may be attached to the web so that a small tube is formed on the envelope which is used for evacuating the air. Although it is not necessary, since a plain bag-shaped envelope draws down tightly against meats of any shape, I prefer to cut away a portion of the web as shown in the figure so that the flanges 12 and 13 together with the remaining portions 15 and 16 of the web may form pockets in the envelope which ultimately will receive the hind legs of the animal. The forelegs of the carcass are bent down against the breast and no pockets need be made to receive them.

The V-shape, better illustrated in Fig. 2, (a section on the line 2, 2 of Fig. 1), is given to the dipping form merely to conserve space in the tank. The over-all size of the dipping form is a matter of choice. If a sufficiently thick coat of latex is allowed to build up on the form, I find it possible to use forms possessing only ⅛ of the linear dimensions of the carcass which ultimately will be covered by the envelope, but forms which are reduced from ½ to ⅛ of the size of the animals are found to be satisfactory.

Another form, 17, suitable for making an envelope for enclosing a quarter of beef is shown in Fig. 3. In this case, a web 18 of C section (Fig. 4) is provided with rounded marginal flanges 19 and 21. The small pin 22 is attached to the web at any convenient location to form the evacuating connecting tube. Parts of the marginal flange 21 and a portion of the web 18 have been cut away so that the remaining portion of the web together with the marginal flange 19 will form the leg pocket of the envelope.

Fig. 5 illustrates the appearance of the envelope 24 as the inflation proceeds. The open end of the envelope 24 is gathered about the inflation nozzle 25 by a rubber band 26. Air is admitted through the pipe 27 and controlled by a valve (not shown). The body portion 28 of the envelope is shown distended to a material degree, but the leg pockets 29 and 31 are not distended to the same extent. As previously stated, the rubber in the neck portion 32 of the envelope and in the legs 29 and 31 remains permanently thicker than in the body portion 28. The distension, however, of the whole envelope is great enough to allow it to enfold the whole carcass easily and loosely.

Fig. 6 illustrates the appearance of the envelope 24 in place on the mutton. The neck 32 has now been closed by the string or tape wrapping 33 and hanging loops 34, 34 have been tied about the leg pockets 29 and 31.

After the envelope has been shrunk into contact with the meat by heating, the meat may merely go to a chill room and be chilled according to conventional practice, but, in all cases to secure the best results from my invention, the envelope should be left on the meat until it must be cut up for sale by the retail butcher.

The bags may also be used solely for the tendering of meat. Their use prevents all growth of mold and surface spoilage which always accompanies normal tendering. Not only is the weight of the meat much better conserved, but the hitherto necessary trimming losses are greatly reduced. No rancidity develops if the envelopes are used for the preservation of fowl.

At the temperatures of chilled beef my contracted, unvulcanized rubber envelopes possess very little resilience and will not tear if, inadvertently, a hook or nail is thrust into the carcass. On the contrary, merely a small puncture is made. It is, therefore, not necessary to replace the bag since only a very small area of the meat will be deleteriously affected.

If the meats are frozen, the temperature falls below the so-called "freezing" temperature of rubber. Then, a dead, inelastic skin is formed which, although scarcely more than .002" or .003" thick, resists scraping and abrasion to an astonishing degree. It will not pull away from any puncture or tear and, in effect, the carcass is protected by an inelastic, liquid-impervious, air-tight envelope in intimate contact with the carcass throughout its whole extent.

I find it best to retain the envelope on frozen meat at least until all thawing is complete. The meat may be thawed by hosing the covered carcass with temperate water or it may be hung in a room at normal temperatures. Although the bag itself, as soon as it comes to normal temperature, may be stripped away from the meat without difficulty, it is much better to leave the bag on the meat until all of the meat has thoroughly thawed. This prevents not only possible contamination of the meat by the thawing water, but also prevents "drip" to such a degree that frozen beef thawed in the envelopes closely approaches the quality of chilled beef.

Although I have described my invention as applied to meat carcasses, it is obvious that it may be applied in an equally successful manner to the preservation of poultry, fish, and other foodstuffs, and that in the case of these smaller products, it is not necessary to package the individual pieces separately. In the latter case, the envelope can be inserted in a box with its open end turned down over the margin of the box. The produce may then be packed in the envelope as closely as possible and the open end closed and secured with a string or tape wrapping. Thereafter, the bulk package may be placed either in chilling rooms or under a stream or spray of refrigerating liquid.

The ease of manufacture, low cost, the ease of application, and the surety of protection which my new envelopes give, now makes it possible to enclose beef and all foodstuffs in enevolpes in such a manner that they may be frozen directly in a spray of brine or refrigerant and shrinkage and desiccation may be avoided throughout the whole period of their subsequent storage. The contractability of the envelope and the fact that it pulls down into tight contact with the meat forms a package through which the meat may be inspected without the necessity for removing the envelope. This last is particularly important where the sale of the whole package is made to the ultimate consumer, as in the case of small cuts of beef or poultry.

Though the foregoing describes the use of unvulcanized rubber the properties made use of are found to some degree in rubber films made from partially pre-vulcanized latex and films subjected to low degrees of vulcanization such as are not now commercially used as vulcanized rubber. Such rubbers are included in the term "unvulcanized rubber."

What I claim is:

1. The process of producing envelopes suitable for protecting meat and other foodstuffs during cold-storage which includes forming an unvulcanized rubber envelope having much smaller dimensions than the foodstuff to be protected and then distending the unvulcanized envelope to such a degree that the envelope is rendered physically unstable to a rise in temperature.

2. The process of producing envelopes suitable for protecting meat and other foodstuffs during cold storage which includes depositing a coating of unvulcanized rubber upon a former to form an envelope having leg and neck portions, drying the coating, distending the body portion of said unvulcanized coating to a greater degree than the neck and leg portions, thereby producing an envelope having physical instability to a rise in temperature and possessing thickened neck and leg portions.

3. An envelope suitable for enclosing meat and other foodstuffs consisting of a flexible membrane comprising unvulcanized rubber stretched to between 100% and 600% elongation and capable of shrinking to a material degree when heated.

4. As a completed article of manufacture a flexible bag or container formed essentially of unvulcanized rubber, said bag being suitable for enclosing meat and other foodstuffs during refrigeration and being capable when stretched of remaining substantially distended at or below normal room temperature and of shrinking materially when heated.

5. As a completed article of manufacture a flexible bag or container formed essentially of unvulcanized rubber of greater thickness than required in the final product and having a non-toxic anti-sticking compound on its surface, said bag being suitable for enclosing meat and other foodstuffs during refrigeration and being capable when stretched of remaining substantially distended at or below normal room temperature and of shrinking materially when heated.

6. A bag or container suitable for enclosing meat and other foodstuffs formed essentially of unvulcanized rubber, said rubber being in stretched condition and capable of shrinking materially when heated.

7. The process of producing envelopes suitable for protecting meat and other foodstuffs during cold storage which includes forming an unvulcanized rubber envelope having a neck portion and a body portion and then distending the body portion of said unvulcanized envelope to a greater degree than the neck portion, the body portion being distended to such a degree that it will be rendered physically unstable to a rise in temperature whereby an envelope is produced having a neck portion thicker than the body portion.

HENRI MARIE JOSEPH TYREL DE POIX.